Figure 1:
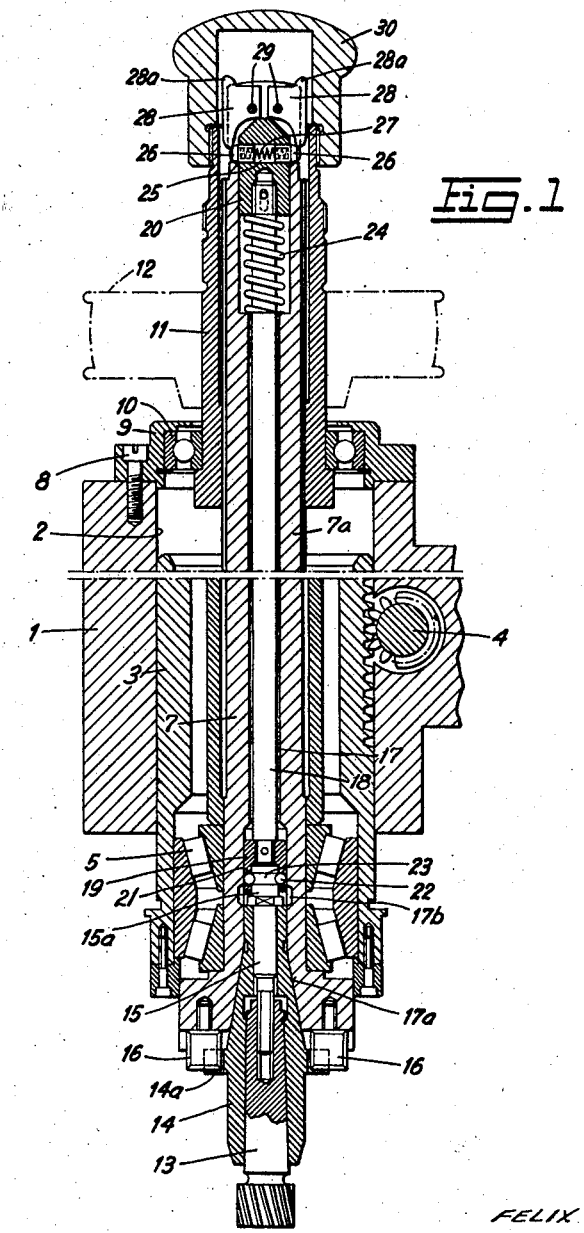

Oct. 13, 1964   F. PERRIN   3,152,811
QUICK-ACTION CHUCK FOR DRILLING AND MILLING TOOLS
Filed March 4, 1963   2 Sheets-Sheet 1

INVENTOR.
FELIX PERRIN
BY
RICHEY, McNENNY, & FARRINGTON.
ATTORNEYS

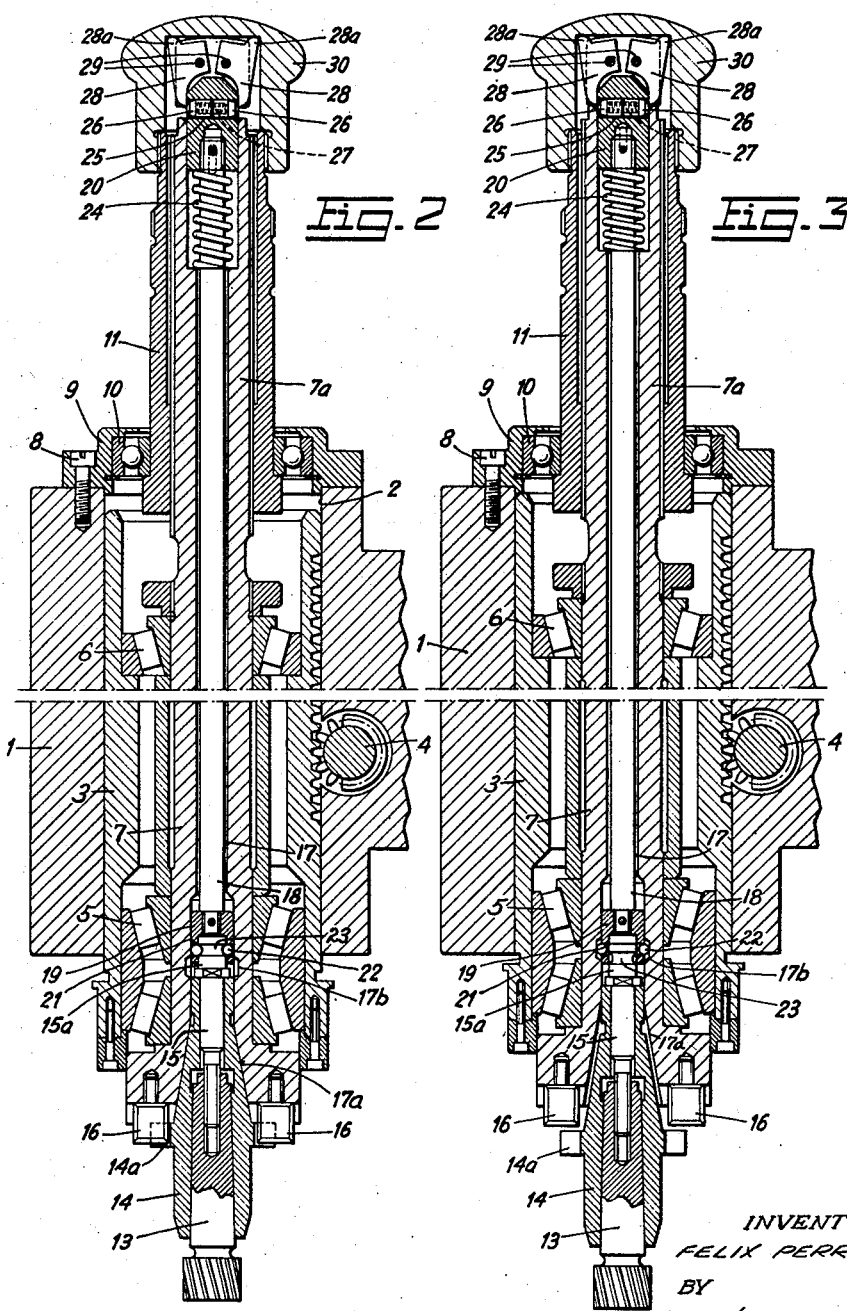

3,152,811
QUICK-ACTION CHUCK FOR DRILLING AND MILLING TOOLS

Felix Perrin, Moutier, Switzerland, assignor to Fabrique de Machines Perrin Freres S.A., Bern, Switzerland
Filed Mar. 4, 1963, Ser. No. 262,602
Claims priority, application Switzerland, Mar. 23, 1962, 3,471/62
4 Claims. (Cl. 279—82)

The present invention relates to a quick-action chuck for drilling and milling tools equipped with a holder, for use on a machine tool having a longitudinally movable tool-carrying spindle.

One object of the invention consists in providing a chuck the operation of which is combined with the movements of the tool-carrying spindle for allowing an easy removal of the holder with the tool when the spindle is wholly retracted and for maintaining the holder fast in the spindle as long as the latter is not retracted.

One feature of the chuck according to the invention is that a chucking member guided to be longitudinally movable in a longitudinal bore of the tool-carrying spindle has a hollow cylindrical front end portion which surrounds the rear end portion of an inserted holder and is provided with a series of openings; a further feature is that a series of balls is provided which are movably mounted in said openings in the radial direction of the end portions and which when said chucking member has been retracted entirely to the rear with respect to the tool-carrying spindle, abut outside against the wall of said bore and thereby are engaged in a peripheral groove of the holder's rear end portion and thereby couple the holder to said chucking member, whereas the same balls when the chucking member has been advanced, can escape into an enlarged portion of said bore to permit of removing the holder; a still further feature consists in that at the rear end of said spindle said chucking member carries means for holding said member in said retracted terminal position until said spindle has moved close to its retracted terminal position, and that an axially immovable structural part is present against which the rear end portion of said chucking member abuts when said spindle has performed its remaining retractive motion.

A preferred embodiment of the invention will now be described by way of example with reference to the accompanying drawings, in which:

FIG. 1 shows the chuck in longitudinal section in the position of use,

FIG. 2 is a longitudinal section similar to FIG. 1, the movable parts, however, being depicted in the position occupied when the tool-carrying spindle is near to its retracted or upper terminal position, and FIG. 3 shows a longitudinal section similar to FIGS. 1 and 2, the movable parts, however, being shown in the position occupied when the tool-carrying spindle has reached its rear or upper terminal position.

In the drawing, 1 designates a spindle head housing of a drilling, boring or milling machine. In a bore 2 of said housing a bushing 3 is guided to be forwardly and rearwardly reciprocable (downwardly and upwardly, respectively, in the drawing) in a well known manner by means of an actuating member 4. A tool-carrying spindle 7 is rotatably mounted in said bushing 3 by means of tapered roller bearings 5, 6 so that the latter moves with said bushing in longitudinal direction.

A hollow driving shaft 11 is mounted in a housing-cover 9 secured to housing 1 by means of screws 8; the mounting is by means of a ball bearing 10, so that the shaft is rotatable, but axially immovable. A drive pulley 12, only indicated in FIG. 1, is secured to the shaft 11. The latter is internally splined and engages the externally splined rear end portion 7a of the tool-carrying spindle 7 to transmit to this spindle 7 the torque for its rotary drive.

The tool 13—a cutter in the example shown—has its slightly conical shank secured in a special holder sleeve 14 by a screw bolt 15. The partly conical and partly cylindrical holder-sleeve rear portion is seated in appurtenant bore-sections of spindle 7. When the holder 14, 15 has been inserted, claws 14a of the holder sleeve engage dogs 16 screwed into the forward end portion of spindle 7, for the purpose of transmitting the torque from spindle 7 to holder 14, 15 and tool 13.

Up to this point, the structure and construction are known per se.

For axially locating the holder 14, 15 in spindle 7, special means, described below, are provided and adapted to release the holder with tool 13 clamped thereto only in the moment when spindle 7 is moved along the last portion of its return motion, such portion amounting to only a few millimeters.

In the longitudinal bore 17 of spindle 7 is located a barlike portion 18 of a chucking member which further comprises a front head 19 and a rear head 20 that are secured to portion 18. The hollow, cylindrical front end-portion of front head 19 engages the rear end-portion 15a of the holder screw-bolt 15 and has a circular series of radial bores 21 (FIG. 3) in each of which a detent member in the form of ball 22 is guided to be movable in the radial direction of spindle 7. In the condition of use (FIG. 1) said balls abut against the wall of the cylindrical section of bore 17 that guides the chucking-member front head 19; the balls 22 are thereby urged to project into a peripheral groove 23 of the portion 15a of bolt 15 so that they abut against the bottom of said groove 23 practically without play and thereby couple the holder 14, 15 to the chucking member 18, 19, 20. A compression spring 24 is inserted with an initial tension between the chucking-member head 20 and an annular shoulder that forms the bottom of a rear enlargement of bore 17 that guides the head 20. Spring 24 exerts on the chucking-member 18 to 20 and the holder 14, 15 coupled thereto, a rearwardly directed force (which in the drawing is pointing upwardly). The chucking-member rear head 20 has a cross-bore 25 which guides two locking studs 26. These studs are urged from each other by a spring 27 inserted therebetween and thus are urged with their slightly conical external end-portion against the steeply conical almost flat rear end-face of spindle 7. The chucking member 18–20 thereby is prevented from advancing with respect to spindle 7 and thus also from uncoupling from holder 14, 15.

In a cross-slot of the chucking-member rear head 20 two unlocking levers 28 are disposed symmetrically with respect to the common longitudinal axis of the spindle 7 and of the chucking member; these levers are mounted on said head 20 by means of bearing pins 29 located close to this axis. Each of said unlocking levers 28 has a rearwardly pointing nose 28a situated outside of the cross-slot of head 20. A cap 30 screwed onto the rear end of the hollow drive shaft 11 acts as an axially immovable stop.

During a small portion of the retractive (upward) movement of spindle 7 and of the chucking member, the noses 28a abut against the bottom of the bore of cap 30. Therefore, said retractive movement causes such pivotal movement of the levers 28 that the latter act with their forwardly-pointed arms onto the studs 26 which thereby are caused to move entirely into the cross-bore 25; in this manner the studs are rendered inoperative in order to allow for a succeeding advance of head 20 with respect to spindle 7. At the same time, the bulged rear end-face of head 20 will abut against the bottom of the bore of the cap 30. Such intermediate position is shown in FIG. 2.

In the last portion of the retractive movement of spindle 7, the chucking member stands still owing to said abutting of its head 20 against the bottom of the bore in cap 30 stands still; this is equivalent to a forward movement of chucking member 18, 19, 20 with respect to spindle 7. Owing to such relative movement, the holder sleeve 14 is slightly advanced by the chucking-member head 19 that presses against the rear end-face of bolt 15; consequently the conical portion of sleeve 14 is disengaged from the concial section 17a (FIG. 3) of the bore 17 of spindle 7. At the same time, the balls 22 move into the range of an enlargement 17b of that section of bore 17 in which the front chucking-member head 19 is guided. When drawing out the holder 14, 15 together with tool 13, the rearmost portion of the holder screw-bolt 15 pushes the balls 22 simply into said enlargement 17b.

The inner edge of the bores 21 in head 19 is slightly narrowed so that the balls 22 cannot leave the bores when the holder 14, 15 is removed.

What I claim is:

1. A quick action chuck mechanism for detachably mounting a tool holder in a machine tool having a housing and a longitudinally movable tool carrying spindle in said housing, said spindle having a longitudinal bore, a chucking member mounted in said longitudinal bore for longitudinal movement between front and rear positions, said chucking member having a hollow cylindrical front end portion adapted to receive the rear end portion of the tool holder when the latter is inserted for use, a plurality of radially movable detent members mounted in said front end portion, said detent members abutting at their outer ends against the wall of said longitudinal bore when the chucking member is in the rear position to cause said detent members at their inner ends to engage a peripheral groove on the rear end portion of the tool holder and thereby couple the latter to said chucking member, said longitudinal bore having an enlarged bore portion to allow said detent members to move radially out of engagement with said groove when said chucking member is in the front position to permit said tool holder to be removed, releasable locking means carried on said chucking member adjacent the rear end of said spindle to hold said chucking member in the rear position, an axially immovable member on said housing adjacent the rear end portion of said spindle and said releasable locking means, and means operable by said axially immovable housing portion upon movement of said spindle to the rearmost position to release said releasable locking means to permit said chucking member to move to the front position.

2. A quick action chuck mechanism for detachably mounting a tool holder in a machine tool having a housing and a longitudinally movable tool carrying spindle in said housing, said spindle having a longitudinal bore, a chucking member mounted in said longitudinal bore for longitudinal movement between front and rear positions, said chucking member having a hollow cylindrical front end portion adapted to receive the rear end portion of the tool holder when the latter is inserted for use, a plurality of radially movable balls mounted in said front end portion, said balls abutting at their outer ends against the wall of said longitudinal bore when the chucking member is in the rear position to cause said balls at their inner ends to engage a peripheral groove on the rear end portion of the tool holder and thereby couple the latter to said chucking member, said longitudinal bore having an enlarged bore portion to allow said balls to move radially out of engagement with said groove when said chucking member is in the front position to permit said tool holder to be removed, releasable locking means carried on said chucking member adjacent the rear end of said spindle to hold said chucking member in the rear position, a hollow shaft member secured to said housing surrounding the rear end portion of said spindle and said releasable locking means, and a cap on said hollow shaft engageable by said locking means upon movement of said spindle to the rearmost position to release said releasable locking means to permit said chucking member to move to the front position.

3. A quick action chuck mechanism as set forth in claim 2 including spring means between said spindle and said chucking member biasing said chucking member toward the rear position, wherein said releasable locking means includes a plurality of radially movable locking studs on said chucking member at the rear end thereof, spring means biasing said locking studs radially outward to an outer position, said locking studs in said outer position engaging the rear end of said spindle to positively lock said chucking member in the rear position, a plurality of unlocking levers pivotally mounted on said chucking member rearwardly of said locking studs, each of unlocking levers having one end engageable with said cap and the other end engageable with the adjacent locking stud, whereby movement of said chucking member and said spindle to the rearmost position causes said unlocking levers to engage said cap and pivot to shift said locking studs radially inward out of engagement with the rear face of said spindle to permit said chucking member to move toward the front position against the bias of said spring means.

4. In a machine tool having a housing, a bushing mounted for longitudinal sliding movement in said housing, means to reciprocate said bushing between frontward and rearward positions in said housing, a spindle rotatably journalled in said bushing, said spindle being held against axial movement relative to said bushing while movable therewith in longitudinal reciprocation, a longitudinal bore extending from end to end through said spindle, said spindle having a tool holder receiving recess at the forward end of said longitudinal bore, a tool holder mounted in said recess, interengaging dogs on said tool holder and said spindle to drivingly rotate said tool holder when said tool holder is fully engaged in said recess, said tool holder being releasable out of said recess by axial movement, said tool holder having a cylindrical shank extending into said longitudinal bore, a peripheral annular groove on said cylindrical shank of said tool holder, a chucking member bar mounted for longitudinal movement within said longitudinal spindle bore between front and rear positions, a front head on said chucking member bar adjacent said tool holder, said front head having a cylindrical recess adapted to receive the cylindrical shank of said tool holder, a plurality of radial bores on said front head, a ball in each of said radial bores, said balls being arranged to engage said longitudinal bore at their outer ends and said peripheral groove on said tool holder at their inner ends when said chucking member bar is in the rear position to lock said tool holder to said spindle, said spindle having an enlarged bore portion arranged to permit said balls to move radially outward and disengage from said tool holder when said chucking member bar is in the front position, a hollow shaft rotatably mounted on said housing and surrounding the rear portion of said spindle, said hollow shaft being fixed against axial movement relative to said housing and rotatable with said spindle, an end cap on said hollow shaft axially outward of the rear end of said spindle when said spindle is in the rearward position, a counterbore in the rear end of said spindle extending between said longitudinal bore and the rear end face of said spindle, a rear head on said chucking member bar mounted within said counterbore and extending rearwardly of the rear spindle end face, spring means in said counterbore extending between said spindle and said rear head biasing said chucking member bar toward the rear position, a radial bore in said rear head, a pair of radially movable locking studs in said radial bore, spring means biasing said locking studs radially outward to permit said locking studs to engage the rear end face of said spindle when said chucking member bar is in the rear position to positively lock said chucking member bar in said rear position, a pair of unlocking levers pivotally mounted on said rear head portion rearwardly of said locking studs, said unlocking levers each having one end engageable with said end cap, said unlocking levers having the other end engageable with the adjacent locking stud, whereby when said bushing is moved rearwardly in said housing said spindle is moved toward the rearward position to cause said unlocking levers to engage said end cap to cause unlocking levers to pivot and shift said locking studs radially inward out of engagement with the rear spindle end face whereby further movement of said spindle toward the rearward position causes said spindle to move with respect to said chucking member bar so that said chucking member bar is moved toward the front position with respect to said spindle against the bias of said spring means to permit said front head of said chucking member bar to release said tool holder.

References Cited in the file of this patent
UNITED STATES PATENTS

| | | |
|---|---|---|
| 2,026,448 | Turrettini | Dec. 31, 1935 |
| 2,135,861 | Thompson | Nov. 8, 1938 |
| 2,749,806 | Stephan | June 12, 1956 |